Jan. 24, 1956  A. S. PARKS  2,732,033
SEPARATOR
Filed Oct. 31, 1952

Asbury S. Parks
INVENTOR.
BY Vincent Martin
Joe E. Edwards
and
B.R. Pravel
ATTORNEYS United States Patent Office 2,732,033
Patented Jan. 24, 1956

2,732,033
SEPARATOR
Asbury S. Parks, Houston, Tex.
Application October 31, 1952, Serial No. 317,932
2 Claims. (Cl. 183—111)

This invention relates to new and useful improvements in separators and relates particularly to liquid knockout apparatus for separating liquids from flowing gas streams.

One object of the invention is to provide an improved liquid-gas separator comprising a vertically disposed vessel having means therein for efficiently separating the liquid from a gas stream which is directed through the vessel.

An important object of the invention is to provide a liquid knockout apparatus consisting of a vertical separator vessel having an inlet for the gas stream nearer its upper end and also having means therein for directing said stream downwardly in a circuitous or tortuous path to encourage precipitation of the liquid constituents of the stream, said vessel having a gas outlet at its upper end for escape of the gas stream therefrom; the arrangement utilizing the natural tendency of the liquid particles to fall downwardly by gravity to effect the separation of said liquid from the gas stream.

Another object is to provide an improved baffle arrangement or scrubber assembly within a vertical separator vessel, which baffle arrangement is so constructed that the fluid stream flowing therethrough is caused to change direction several times and the liquid particles therein are caused to impinge upon numerous surfaces to encourage coalescence and accumulation, as well as precipitation of said particles to thereby effect separation of the liquids from said stream.

A particular object is to provide a vertical type liquid knockout which is particularly adaptable for use in separating liquids from high pressure well streams which are primarily in the gaseous phase.

Still another object is to provide a separator of such construction that pressure drop across the scrubber assembly does not affect the operation whereby carry over of liquids into the gas outlet is eliminated; the device also having provision for accumulation of mud, sand and other foreign matter which might enter said device to thereby obviate such foreign matter interfering with normal operation or reducing the capacity thereof.

A still further object is to provide a separator of the character described, which may operate under high pressure and which has maximum capacity with minimum vessel size.

The construction designed to carry out the invention will be hereinafter described together with other features thereof.

Figure 1:
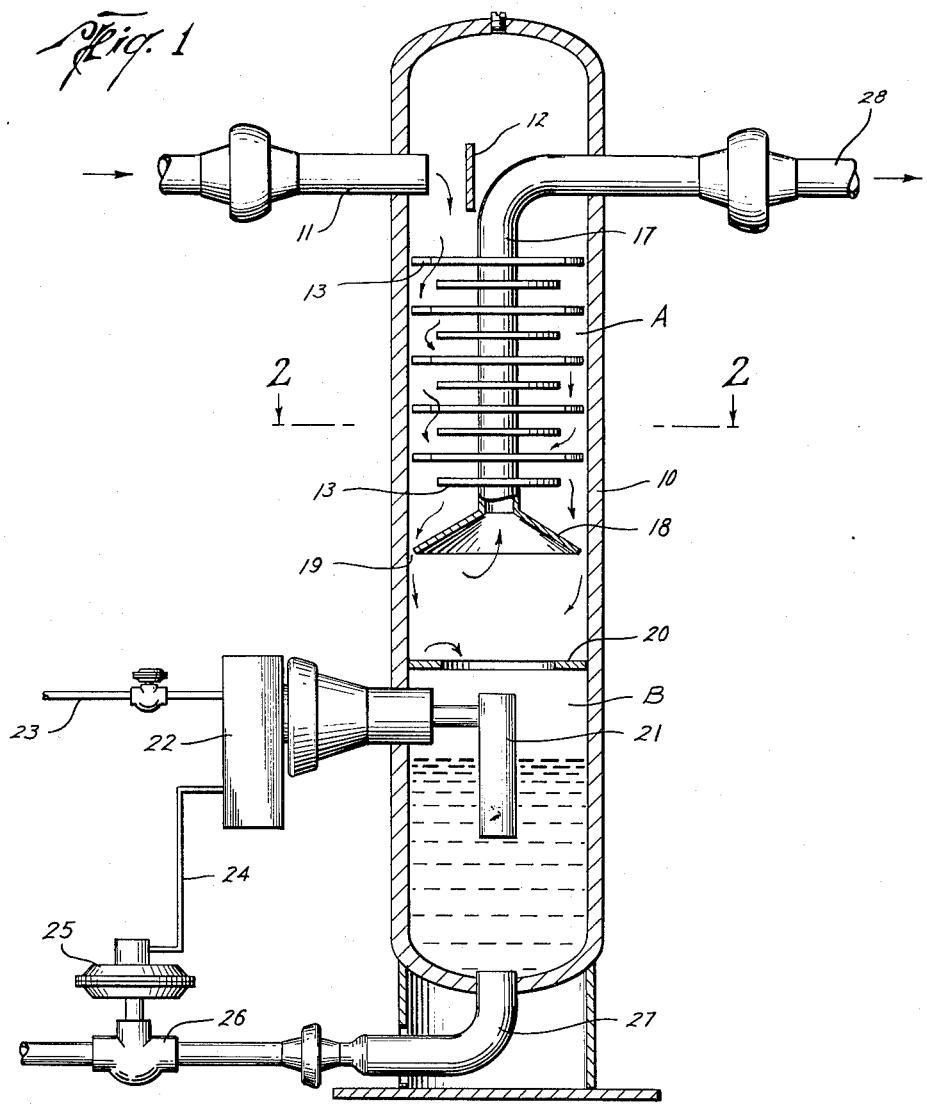
Figure 2:
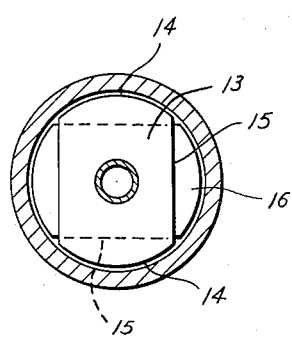

The invention will be more readily understood from a reading of the following sepcification and by reference to the accompanying drawings forming a part thereof, wherein an example of the invention is shown, and wherein:

Figure 1 is a transverse, vertical sectional view of a liquid knockout apparatus, constructed in accordance with the invention, and Figure 2 is a horizontal, cross-sectional view, taken on the line 2—2 of Figure 1.

In the drawings the numeral 10 designates a vertically disposed tank or vessel which is generally cylindrical in cross-section. An inlet pipe 11 is connected in the upper end of the tank or vessel and discharges the incoming high pressure well stream into the interior of the vessel against a transverse deflector or wear plate 12.

Below the inlet and within the interior of the vessel is a scrubber assembly generally indicated at A, which assembly is formed by a series of transversely extending baffles 13. The baffle plates are constructed in an identical manner, and each plate is formed with diametrically opposed curved edges 14 (Figure 2) and with diametrically opposed parallel straight edges 15. The radius of each curved edge 14 conforms generally to the internal wall of the vessel and is in close proximity to said wall. The straight edges of each plate are spaced from the wall and provide flow areas 16 whereby fluid may escape downwardly past the plate.

The baffle plates 13 are secured to a conduit 17 which is disposed axially within the vessel and the plates 13 are so arranged on the conduit that the straight edges 15 of one plate are located at an angle of 90° from the straight edges 15 of the adjacent baffles. In this way the flow spaces 16 formed between the straight edges 15 of the baffle plates and the wall of the vessel are misaligned so that fluid flowing downwardly through the baffle arrangement must take a circuitous or tortuous path. Thus, the incoming well stream, after impinging against the deflecting or wear plate 12, is spread and its direction of flow is abruptly changed to a downward direction; the fluid flows downwardly through the baffle plates 13 of the scrubber assembly and due to the disposition of said plates impinges against the surfaces thereof in such downward passage. The curved edges 14 of each baffle plate are illustrated as spaced a slight distance from the inner wall of the vessel but if desired such curved edges may be in engagement with said wall; so long as the flow stream is caused to travel through the vertical flow spaces 16 the purposes of the invention will be accomplished.

The lower end of the conduit 17 has a downwardly inclined annular baffle 18 secured thereto and as the flow stream passes downwardly from the lowermost baffle 13, said fluid stream strikes the inclined baffle and is directed outwardly against the wall of the vessel, escaping downwardly past the baffle through a relatively small annular space 19 which is formed between the baffle and the wall of the vessel. Below the inclined baffle is a deflector ring 20 which is suitably secured within the vessel, and this ring is in vertical alignment with the flow space 19; thus, the fluid passing downwardly around the inclined baffle 18 contacts the upper surface of the ring and is deflected around the ring. The heavier liquids in the flow stream precipitate downwardly into the lower end of the vessel or tank which forms a liquid zone B therein. The level of the accumulated liquids is maintained by means of a float 21 which actuates a pilot controller 22. The controller may be of any suitable construction and controls the application of pilot pressure from a pilot pressure line 23 through a conductor 24 to the motor 25 of a motor valve 26. The motor valve is connected in an outlet line 27 which extends from the lower end of the vessel or tank. Obviously when the level of the liquid within the liquid zone B rises above a predetermined point the controller 22 is operated to open the valve 26 and permit the escape of liquid from the vessel.

The high pressure gas stream from which liquids are precipitated in its travel through the scrubber assembly A passes downwardly around the inclined baffle 18 and then upwardly through the conduit 17. The conduit has its upper end turned outwardly to extend through the tank wall and has connection with a gas outlet line 28.

The operation of the device is believed obvious from the foregoing. The high pressure well stream is introduced through the inlet 11 against the deflector or wear plate 12 which absorbs the main velocity of flow of the incoming stream. The impingement of the stream against the plate 12 causes some of the liquids to accumulate and coalesce on the plate and then precipitate downwardly. Upon being spread by the deflector plate 12 the flow stream moves downwardly and into contact with the uppermost baffle plate 13 of the scrubber assembly A with the stream impinging against the upper surface of the plate. To escape downwardly the flow stream must move laterally to the flow spaces 16, and upon passing through such flow spaces strikes the next below baffle. Flow then continues through the baffles of the assembly in a circuitous or tortuous path with maximum contact of the flow stream with the obstructing surfaces of the baffles. Upon passing around the lowermost baffle the stream contacts the conical baffle 18 and is deflected outwardly into the contact with the wall of the vessel escaping through the annular space 19 around said baffle. The liquid in the flow stream impinging against the various surfaces of the baffles and the wall of the vessel will accumulate and coalesce in droplets of sufficient size to precipitate the same by gravity; since the flow is in a downward direction, which is the direction in which the liquid tends to fall by gravity, separation of the liquid from the flow stream is facilitated and the liquid ultimately falls downwardly into the liquid zone B in the lower portion of the vessel.

The gaseous flow stream having the liquids separated therefrom passes around the lower end of the conical baffle and flows upwardly through the conduit 17 to be finally conducted from the vessel through the outlet pipe 28. It will be evident that pressure drop across the scrubber assembly is unimportant because the flow stream is first directed downwardly and then may pass upwardly through the conduit with the heavier liquid particles continuing their travel in a downward direction. The construction of the separator is such that any mud or sand which may be present in the flow stream will have no effect on the operation. Even though there may be some accumulation of foreign matter on the baffles 13 the passages 16 are of sufficient size to assure that a stoppage of the flow through the separator will not occur. Any sand or liquids in the flow stream, being heavier, will precipitate downwardly from the flow stream B and are withdrawn from the vessel with the liquids.

The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, I claim:

1. A separator including, a substantially cylindrical vertically disposed vessel, an inlet pipe extending radially into the upper portion of the vessel, an elongate axially disposed conduit having its lower end open and spaced from the inlet pipe with the upper end of said conduit being directed outwardly through the wall of the vessel, an outlet pipe connected with the conduit, a plurality of transverse baffle plates disposed in horizontal planes and supported upon the conduit in spaced relationship, each baffle having a flow opening permitting downward flow past the baffle, and a generally conical deflector baffle secured to the lower end of the conduit and having its peripheral edge in close proximity to but spaced from the inner wall of the vessel to provide an annular space whereby the flow stream passing downwardly around the baffle plates passes downwardly around the conical deflector baffle and is directed into intimate contact with the wall of the vessel, the liquids precipitating downwardly into the lower end of the vessel and the well stream flowing upwardly around the deflector baffle and through the conduit to the outlet conductor.

2. A separator as set forth in claim 1, together with an annular deflector ring located within the vessel below the deflector baffle and aligned with the annular space between said deflector baffle and the wall of the vessel, said deflector ring extending inwardly from the wall of the vessel a greater distance than the area of the annular space formed between the deflector baffle and the wall of the vessel.

References Cited in the file of this patent

UNITED STATES PATENTS

| | | |
|---|---|---|
| 756,942 | Duck | Apr. 12, 1904 |
| 868,156 | Berryman | Oct. 15, 1907 |
| 1,452,253 | Nevitt | Apr. 17, 1923 |
| 1,813,637 | Powers | July 7, 1931 |
| 1,919,599 | Schonberg | July 25, 1933 |
| 2,290,323 | Graham | July 21, 1942 |

FOREIGN PATENTS

| | | |
|---|---|---|
| 28,406 | Great Britain | Dec. 27, 1904 |
| 355,536 | Germany | June 28, 1922 |